(12) United States Patent
Crawford et al.

(10) Patent No.: US 8,204,846 B1
(45) Date of Patent: *Jun. 19, 2012

(54) TROPICAL CYCLONE PREDICTION SYSTEM AND METHOD

(75) Inventors: Todd Michael Crawford, Hudson, NH (US); Peter Paul Neilley, Hollis, NH (US); William Douglas Ramstrom, Boston, MA (US)

(73) Assignee: WSI, Corporation, Andover, MA (US)

( * ) Notice: Subject to any disclaimer, the term of this patent is extended or adjusted under 35 U.S.C. 154(b) by 1068 days.

This patent is subject to a terminal disclaimer.

(21) Appl. No.: 12/148,402

(22) Filed: Apr. 18, 2008

(51) Int. Cl.
*G06F 15/00* (2006.01)
*G06F 15/18* (2006.01)

(52) U.S. Cl. ............... 706/62; 706/45; 706/46; 706/47; 706/52

(58) Field of Classification Search .................. None
See application file for complete search history.

(56) References Cited

U.S. PATENT DOCUMENTS

| | | | |
|---|---|---|---|
| 4,402,672 A * | 9/1983 | Lowe, Jr. ................ 434/217 |
| 6,169,476 B1 * | 1/2001 | Flanagan ............... 340/286.02 |
| 6,188,960 B1 * | 2/2001 | Baron et al. ................ 702/3 |
| 6,339,747 B1 * | 1/2002 | Daly et al. ................ 702/3 |
| 6,401,039 B1 * | 6/2002 | Baron et al. ................ 702/3 |
| 6,535,817 B1 | 3/2003 | Krishnamurti |
| 6,654,689 B1 * | 11/2003 | Kelly et al. ................ 702/3 |
| 6,691,035 B1 | 2/2004 | Kang |
| 7,191,064 B1 * | 3/2007 | Myers et al. ................ 702/3 |
| 7,200,491 B1 * | 4/2007 | Rose et al. ................ 702/3 |
| 7,219,015 B2 | 5/2007 | Bresch et al. |
| 7,359,799 B2 | 4/2008 | Bresch et al. |
| 7,515,088 B1 * | 4/2009 | Woodell et al. ............. 342/26 B |
| 7,734,245 B2 * | 6/2010 | Ravela et al. ................ 434/8 |
| 7,788,036 B1 * | 8/2010 | Neilley et al. ................ 702/4 |
| 7,792,642 B1 * | 9/2010 | Neilley et al. ................ 702/3 |
| 7,792,664 B1 * | 9/2010 | Crawford et al. ................ 703/6 |
| 2006/0155628 A1 * | 7/2006 | Horowitz ................ 705/35 |
| 2007/0168155 A1 | 7/2007 | Ravela et al. |
| 2007/0203759 A1 | 8/2007 | Mathai et al. |
| 2007/0214023 A1 | 9/2007 | Mathai et al. |
| 2007/0221743 A1 * | 9/2007 | Weinzapfel et al. ......... 239/14.1 |
| 2007/0223841 A1 | 9/2007 | Weinzapfel et al. |
| 2008/0133430 A1 * | 6/2008 | Horowitz ................ 705/36 R |

\* cited by examiner

*Primary Examiner* — Omar Fernandez Rivas
(74) *Attorney, Agent, or Firm* — Carlineo, Spicer & Kee, LLC

(57) ABSTRACT

A method of providing information related to a weather phenomenon includes obtaining a plurality of model tracks corresponding to a weather phenomenon from at least one forecast center. A probabilistic description of one or more characteristics of the weather phenomenon is determined based on a statistical analysis of the model tracks corresponding to the weather phenomenon. An electronic representation of the probabilistic description is provided.

32 Claims, 10 Drawing Sheets
(2 of 10 Drawing Sheet(s) Filed in Color)

TROPICAL CYCLONE PREDICTION SYSTEM AND METHOD

CROSS REFERENCE TO RELATED APPLICATIONS

This application is related to U.S. patent application Ser. No. 12/148,376, entitled Tropical Cyclone Prediction System and Method, filed Apr. 18, 2008, and U.S. patent application Ser. No. 12/148,390, entitled Tropical Cyclone Prediction System and Method, filed Apr. 18, 2008, the entire disclosures of which are incorporated herein by reference.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BRIEF DESCRIPTION OF THE DRAWINGS

The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

The patent or application file contains at least one drawing executed in color. Copies of this patent or patent application publication with color drawing(s) will be provided by the Office upon request and payment of the necessary fee.

In the Drawings:

FIG. 1 is a use case diagram for the tropical cyclone prediction system in accordance with an embodiment of the present invention;

FIG. 2 is a flow diagram for the tropical cyclone prediction system in accordance with an embodiment of the present invention;

FIG. 3 is a representation of exemplary model tracks for tropical cyclones in accordance with the tropical cyclone prediction system of FIG. 1;

FIGS. 4A-4C are representations of exemplary model tracks for a tropical cyclone in accordance with the tropical cyclone prediction systems of FIG. 1;

FIG. 5 is a graphical representation of boundary intersection functions in accordance with the tropical cyclone prediction system of FIG. 1;

FIG. 6 is a representation of actual model tracks for two different tropical cyclones in accordance with the tropical cyclone prediction system of FIG. 1;

FIG. 7 is a time sequence of mean forecast tracks for two different tropical cyclones in accordance with the tropical cyclone prediction systems of FIG. 1;

FIG. 8 is a graphical representation of boundary intersection functions in accordance with the tropical cyclone prediction system of FIG. 1;

FIG. 9 is a network diagram that includes the tropical cyclone prediction system of FIG. 1; and FIG. 10 is a block diagram of a computer system for realization of the tropical cyclone prediction system of FIG. 1.

DETAILED DESCRIPTION

Figure 1:
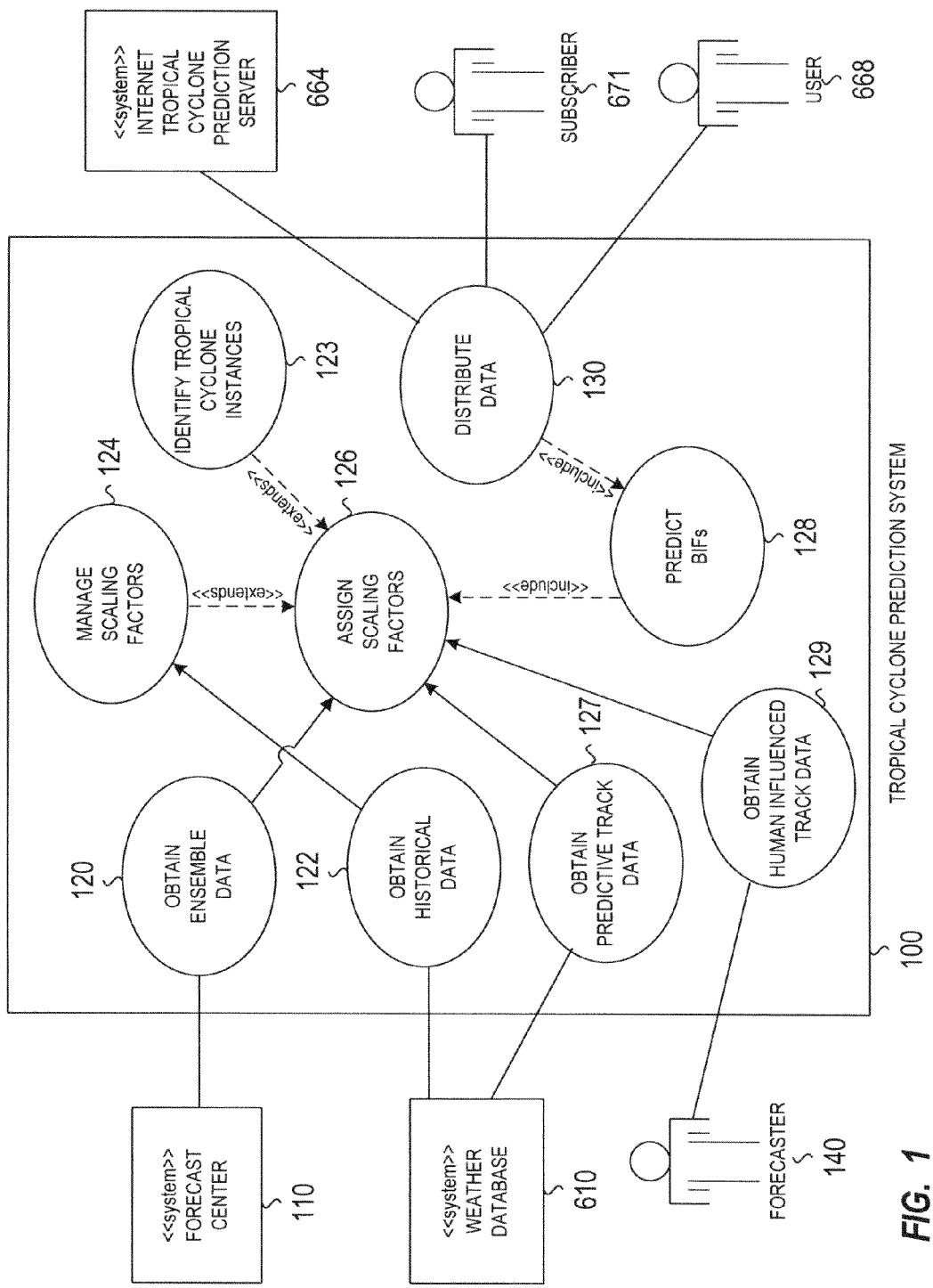

Certain terminology is used herein for convenience only and is not to be taken as a limitation on the present invention. In the drawings, the same reference letters are employed for designating the same elements throughout the several figures.

The words "right", "left", "lower" and "upper" designate directions in the drawings to which reference is made. The words "inwardly" and "outwardly" refer to directions toward and away from, respectively, the geometric center of the tropical cyclone prediction system and designated parts thereof. The terminology includes the words above specifically mentioned, derivatives thereof and words of similar import.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the embodiments of the present invention, but do not constrain implementation thereof to any particular hardware or software embodiments. Unless otherwise noted, the notation used with respect to the UML diagrams contained herein is consistent with the UML 2.0 specification or variants thereof and is understood by those skilled in the art.

Hereafter, relative to the discussion of the tropical cyclone prediction system, the term tropical cyclone refers to tropical storms, hurricanes, typhoons, and any other rotating storm systems of tropical nature understood by one of ordinary skill in the art. The methods described below, while generally discussed and exemplified herein using hurricanes originating in the Northern Atlantic basin, are not limited to cyclonic storms in the region, but are applicable to tropical cyclones originating in any of the waters of the world. Furthermore, the methods described below should not be considered as limited to embodiments for tropical cyclones, but may be applied to any weather phenomenon. Weather phenomena include any type of storm, including tropical cyclones, convective storms, such as thunderstorms and thunderstorm systems, tornado, winter storms, fronts, and any other type of storm, storm system, weather event, weather system, or weather pattern recognized by one skilled in that art.

Accurate forecasting of tropical cyclones is critical for the assessment of the risk of losses due to tropical cyclones as well as civic planning of evacuations and emergency preparations for those locations most likely affected by the tropical cyclones. Forecast centers, one example of which is the National Centers of Environmental Prediction (NCEP), provide periodic updates of expected tropical cyclone tracks by running complex models utilizing the more recent observational data. These updates include a range of potential locations of the center of circulation of the tropical cyclone as a function time for some period of time. For example, the National Hurricane Center (NHC), which is a center within the NCEP, only disseminates hurricane forecasts out to five days. Since NHC and other centers only produce forecasts for the short term, the public is left with little guidance on which areas will most likely be affected by the tropical cyclone when it is still far from land. Further, the NHC forecast "cone" of uncertainty is based solely on historical forecast errors rather than the predictability of the current tropical cyclone, which can vary significantly from case to case. The tropical cyclone prediction system (TCPS) described herein predicts tracks and characteristics of tropical cyclones as well as providing quantitative measures of the uncertainty of those predictions, which is especially important at forecast lead times beyond the typical five days provided by the NCEP and other forecast centers. Characteristics include, but are not limited to intensity, minimum central pressure, wind speed, storm surge height, radius of impact (e.g., extent of hurricane force winds), precipitation rate, and tornado potential. By intelligently combining model data obtained from various global meteorological models, the TCPS can provide tropical cyclone forecasts for many days beyond what is currently available from the National Centers of Environmental Prediction or other tropical forecasting centers around the world.

The forecast data provided by the TCPS may be useful to a variety of different sectors. The insurance industry can combine the forecast data with landfall damage models to assess potential insured losses by taking into account the intensity at landfall and the insured value of property in the expected landfall region. Local, state, and federal emergency management agencies can utilize the forecast data from the TCPS to order mandatory evacuations with a lower probability of false alarms. Emergency shelter preparation and large scale staging of resources and supplies can be also facilitated with greater confidence where those resources are most needed.

FIG. 1 is a use-case diagram for the tropical cyclone prediction system 100 and associated systems and actors in accordance with one embodiment of the present invention. Referring to FIG. 1, the tropical cyclone prediction system 100 includes an obtain ensemble data use case 120 that the TCPS 100 utilizes to obtain the most current ensembles of model tracks from various forecast centers 110, which provide periodic updates on the actual and expected path and intensity of tropical cyclones. The TCPS 100 may also obtain short range forecast model data using an obtain predictive track use case 127. The short range model data may be determined using models obtained from the weather database 610, or alternately stored on an internal database associated with the TCPS 100. A forecaster 140 may provide input into the TCPS 100 using an obtain human influenced track data use case 129. An assign scaling factors use case 126 associates a scaling factor for each model track of the ensemble data received from the forecast centers 110. The assign factors use case 126 is extended by a manage scaling factors use case 124. The manage scaling factors use case 124 determines the scaling factors by comparing and analyzing actual data for a tropical cyclone with the model data from the forecast centers 110. The actual data for the tropical cyclones is obtained from one or more weather databases 610 using an obtain historical data use case 122. The assign scaling factors use case 126 is further extended by an identify tropical cyclone instances use case 123. The identify tropical cyclone instances use case 123 is used to identify new instances of tropical cyclones that are predicted to form after an initialization time associated with the current forecast period for the models used to generated the ensemble of model tracks from the forecast center 110. The TCPS 100 utilizes a predict BIF use case 128, which includes the assign scaling factors use case 126, to aggregate the scaled model tracks and determine boundary intersection functions (described below) for the predicted landfall position and characteristics of the tropical cyclone, such as wind speed or intensity. The boundary intersection functions are made available to an entity, such as a user 668 or subscriber 671 using a distribute data use case 130 which includes the predict BIFs use case 128. Display mechanisms and human-machine interfaces for distribution of the TCPS 100 output data are generally known in the art, and should not be considered limiting. Furthermore, the entity may be an computer system or network designed to interact with the TCPS 100, such as an internet tropical cyclone prediction server 664.

Figure 2:
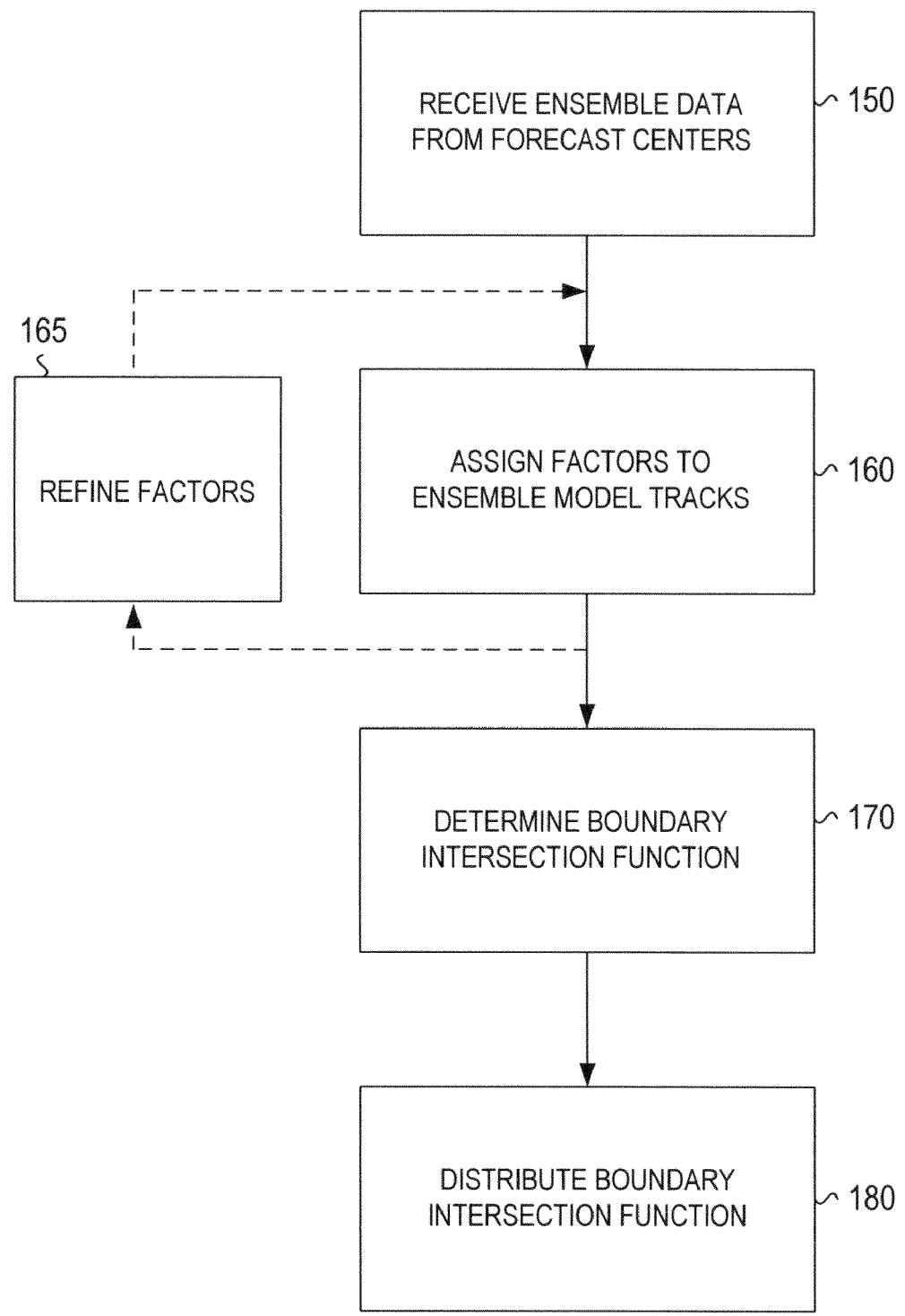

Referring to FIG. 2, in order for the TCPS 100 to provide boundary intersection functions associated with the tracks and characteristics of tropical cyclones, ensemble data of model tracks for a tropical cyclone generated by forecast centers are received 150. The TCPS 100 assigns scaling factors to each track of the ensemble data 160 and determines boundary intersection functions for the track and characteristics of the tropical cyclone from the aggregated model tracks and the associated scaling factor assigned to each 170. The scaling factors are refined or updated 165 based on comparing the actual track and actual characteristics of a tropical cyclone with the tracks and characteristics predicted by the ensemble data from the various forecast centers. The boundary intersection functions and other data provided by the TCPS 100 are distributed to users and other external entities 180. In one embodiment the boundary intersection function for the track of a tropical cyclone is for landfall of the tropical cyclone as a function of distance along a geographic boundary, such as a coastline.

The TCPS 100 utilizes model data obtained from forecast centers. Some examples of forecast centers include, but are not limited, to the National Centers of Environmental Prediction (NCEP), European Centre for Medium-Range Weather Forecasts (ECMWF), and Environment Canada (EC). As one skilled in the art will recognize, model data from other forecasting centers, both government sponsored or privately funded, may be utilized by the TCPS 100. The forecast centers typically provide updated model data every 12 hours, although one skilled in the art will recognize that the frequency could be greater or less than twice daily. The forecast center model data spans a period of time starting at the initialization time for the model runs and ending at a termination time for the model runs. For example, each model run may span a period of time of 240 hours (10 days) from the initialization time of the model run, although it is understood by one skilled in the art that the time period spanned by the model run may be greater than or less than 240 hours. The model data from the forecast centers consists of an ensemble of model tracks produced using sophisticated atmospheric models. One forecast center model run produces a model track for the tropical cyclone based on the initial conditions input into the model, where the model track projects the path and intensity of the tropical cyclone. By perturbing the initial conditions based on estimated uncertainties in those conditions, a set of possible model tracks, or an ensemble, for the tropical cyclone is created. Thus, each of the forecast centers produces an ensemble of model tracks to provide a range of potential paths for the tropical cyclone based on small perturbations of the initial conditions. A typical ensemble may contain 10-60 different paths obtained from varying the initial conditions of the model, although it is understood by one skilled in the art that the range 10-60 should not be considered limiting (i.e., an ensemble may contain more than 60 model tracks or less than 10 model tracks).

Figure 3:
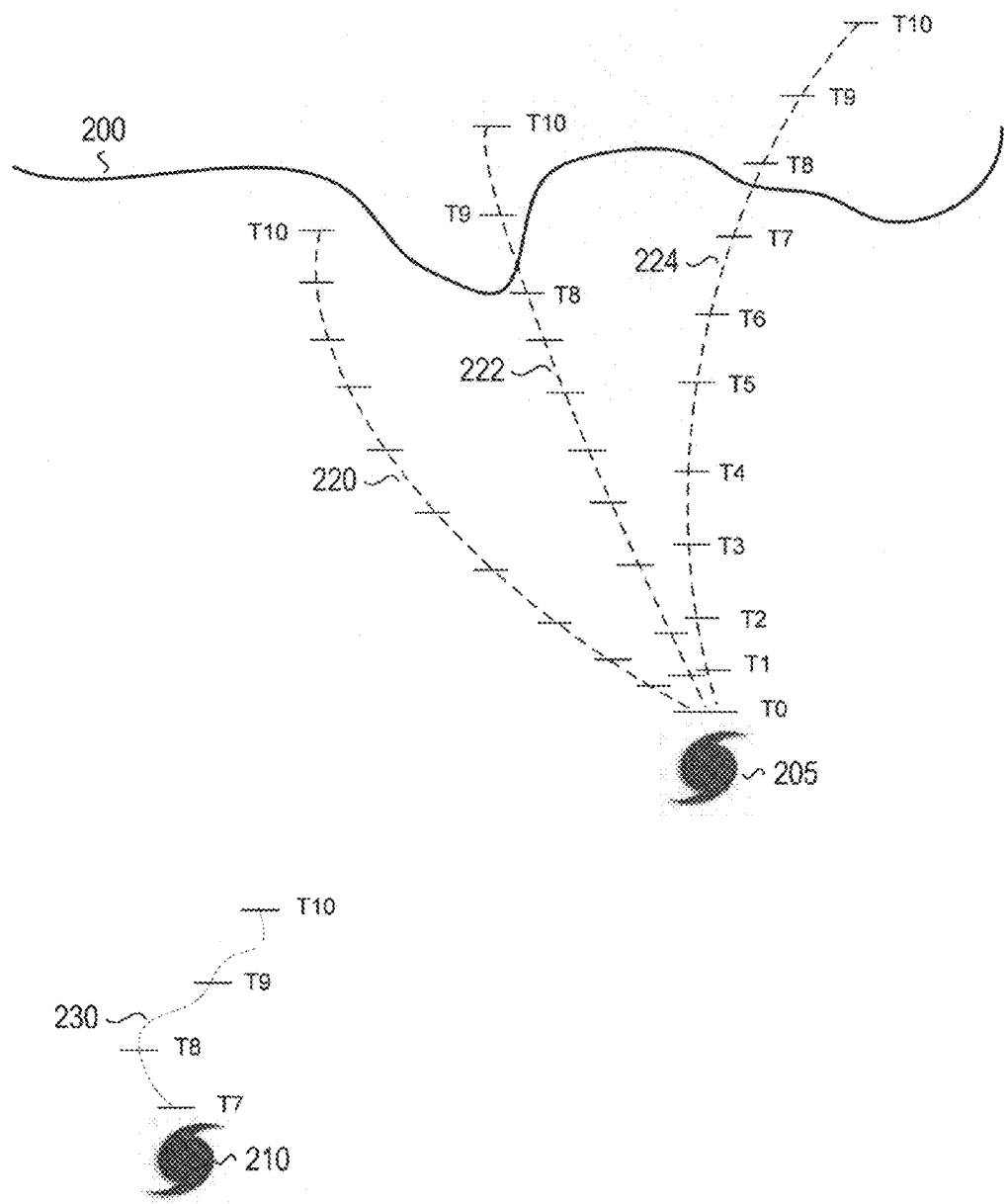

Each model track may span a maximum time period corresponding to the initialization time for the model run and the termination time for the model run, although a model track may span a smaller time period if the model run indicates the tropical cyclone dissipating before the end of the model run, or conversely, the model run indicates the tropical cyclone forming after the initialization time for the model run. Referring to FIG. 3, exemplary model tracks 220, 222, 224, and exemplary model track 230 are shown for exemplary tropical cyclones 205 and 210, respectively. On each model track, an indication of time from the initialization time, T0, is shown by the horizontal bars intersecting each of the model tracks. The time span of the model run for these exemplary model tracks is 10 days, as indicated by the termination of each model track at T10. It should be noted that each time indicator for all the models tracks is not labeled in FIG. 3, although both model tracks 224 and 230 have a complete set of time indicators labels. Tropical cyclone 205 has been identified to have formed at or prior to T0 since model tracks exist for tropical cyclone 205 at the T0 initialization time. Tropical cyclone 210 does not have a corresponding model track for the initialization time T0 of the model run, instead it predicted to form around time T7 of the model run. Model tracks 222 and 224 are shown to cross a boundary 200 at time ranges T8-T9 and T7-T8, respectively. Model track 220 does not intersect the boundary 200 during the time span of the model run.

For each forecast period, the TCPS 100 verifies each instance of a tropical cyclone based on the model data obtained from the forecast centers. By comparing the ensemble of model tracks for successive forecast periods, the TCPS 100 can correlate an instance of a tropical cyclone identified from a previous forecast period with model tracks for the current forecast period. If the TCPS 100 cannot correlate any model tracks from the current forecast period with an instance of a previously identified tropical cyclone, the TCPS 100 discontinues providing output data related to the track and characteristics of the tropical cyclone, presumably because the tropical cyclone has either dissipated or poses no further threat to economic or popular interests. The TCPS 100 may also identify new instances of a tropical cyclone if the current model data contains model tracks that cannot be correlated with a previously identified instance of a tropical cyclone. For example, referring again to FIG. 3, tropical cyclone 210 is predicted to form near time T7 for a forecast period. If a previous forecast period (not shown) does not include any tropical cyclone instances that can be associated with the model track 230, then the TCPS 100 predicts a new tropical cyclone instance for 230 during the current forecast period.

The TCPS 100 may also augment the ensemble of model tracks obtained from the forecast centers 110 with predictive track data obtained from sources other than the forecast centers 110. The predictive track data is obtained using models well understood in the art, as well as incorporating human influence forecast data. These models may be retrieved from a weather database 610 or alternately stored in a database internal to the TCPS 100. For example, the predictive track data may be obtained using a number of different short range (0-5 day) tropical prediction models where the predictive tracks obtained using those models have demonstrated a higher correlation with the actual tracks of tropical cyclones for time periods just after the formation of the tropical cyclone (e.g., within the first five days after the formation of the tropical cyclone), but typically show a greater divergence than the ensemble model tracks for times farther from the formation of the tropical cyclone (e.g., more than five days after the formation of the tropical cyclone). Examples of these short-range tropical prediction models include the Geophysical Fluid Dynamic Laboratory (GFDL) and Hurricane Weather Research Forecast (HWRF) models. In one embodiment, the ensemble model and predictive track data utilized by the TCPS 100 is influenced by human forecast experience and/or intuition. For example, for situations where the ensemble model and predictive model tracks are known to be unreliable, a human forecaster may provide a determination as to which of the ensemble model or predictive tracks are used by the TCPS 100 based on experience and intuition of how a tropical cyclone is expected to track.

The TCPS 100 receives the most recent ensembles of model tracks from the forecast centers 110. Each track is assigned a scaling factor by the TCPS 100. The scaling factors provide a measure of the skill for which the forecast center is known for producing model tracks compared with the actual path of the tropical cyclone. In an embodiment, higher scaling factors are generally indicative of greater skill. The actual path which tracks the center of circulation of the tropical cyclone is often referred to as the actual "best track". The scaling factors may be determined by the TCPS 100 by analyzing and comparing the model tracks of the forecast centers 110 with actual tracks of the tropical cyclones. For example, historical comparison of model tracks produced by the NCEP vs. EC may demonstrate that the ensemble data for the NCEP is more likely to predict the actual best track of the hurricane. By using the scaling factors, the TCPS 100 can aggregate model tracks from any number of sources, and effectively rank the data so the historically more accurate sources of model tracks have greater effect on the TCPS 100 output. In an embodiment, the scaling factors determined by the TCPS 100 for each forecast center are dependent on the location, time of year, or characteristics of the tropical cyclone. For example, the ECMWF may be more skillful at modeling tropical cyclones early in their lifecycle, while the NCEP produces more skillful ensembles of model tracks as the tropical cyclone approaches a land mass, or the ECMWF is more skillful for tropical cyclones over the Atlantic Ocean, with NCEP more likely to produce accurate model tracks of Gulf tropical cyclones. As another example, the EC may provide model tracks that historically track the actual track for a tropical cyclone in June, while the model tracks for the NCEP more closely match the actual tropical cyclone tracks in September. Thus, for each forecast center, the TCPS 100 may have stored in a database, a list of scaling factors dependent on absolute location (e.g., geographic coordinates), relative location with respect to a boundary (e.g. distance from a coastline), time of year, atmospheric, oceanic, and land-surface conditions (e.g., wind shear, sea surface temperatures), or characteristics of the tropical cyclones themselves. Therefore, the TCPS 100 may assign a different scaling factor for the ensemble of model tracks from one of the forecast centers 110 for the same tropical cyclone for a different forecast period as the location or characteristics of the tropical cyclone change. In an embodiment, for any one forecast period, different scaling factors may be assigned to different ensemble tracks obtained from the same forecast center. As an example, due to the complexities of the atmospheric models run by the forecast centers 110, and their sensitivities to initial atmospheric conditions, a small number of ensemble model tracks may be produced that are considered outliers (e.g., a model track that does not agree with the general trending of most of the ensemble track, or produces a path that is highly improbably or near impossible for an actual tropical cyclone to follow). These outliers may be assigned an appropriate scaling factor such that their contributions to the output provided by the TCPS 100 are negligible or completely ignored. In an alternate embodiment, the scaling factors are time-varying. Since the positions along the model tracks represent the time evolution of the coordinate for the center of the tropical cyclone, movement along the model track between any two points corresponds to a range in time. The TCPS 100 may assign different scaling factors to a model track for positions along the model track. Since each position along the model track represent a different time in the evolution of the tropical cyclone, the set of factors for the different positions along the model track are representative of a time-varying factor. Referring again to FIG. 3, for the time ranges T0-T1, T1-T2, ..., T9-T10 of model track 224, the TCPS 100 may potentially assign a different scaling factor to one, several, or every time range of the model track. As a result, each model track can have a time varying statistical weight, embodied in the scaling factors, that allows different time ranges within the same model track to have a different contribution to the output provided by the TCPS 100. The use of multiple scaling factors within a single model track allows the TCPS to increase contribution to the output of the TCPS 100 for time ranges where the model data is determined to have a high skill level, and also decrease or eliminate the contribution of time ranges where the model data is known to have low skill level.

As the different forecast centers 110 revise and refine the internal models used to generate the model data, it is expected that the skill level of the various forecast centers 110 in forecasting the tracks and characteristics of tropical cyclones will change over time. Therefore, the scaling factors are periodically refined or updated by comparing the ensemble model data for each of the forecast centers 110 with historical data for tropical cyclones. The historical tropical cyclone data may be obtained from an external weather database 610. The historical tropical cyclone data includes any data related to the actual value of tracks or characteristics of tropical cyclones over their entire lifecycles, as well as corresponding atmospheric, oceanic, and land-surface data related to the tropical cyclones. In one embodiment, the scaling factors are refined and updated after each forecast period by comparing the most recent model tracks with the current actual track of the tropical cyclone.

The predictive track data, including the human influence track data (described above) is easily assimilated into the TCPS 100 with a treatment of the predictive track data the same as that of the ensemble model tracks obtained from the forecast centers 110, but the predictive tracks are assigned a disproportionally high scaling factor with respect to the ensemble model tracks, resulting in the predictive data tracks statistically dominating the output of the TCPS 100 for the track and characteristics of the tropical cyclone. For example, it is know that Predictive Models A, B, and C generally provide a more accurate track more indicative of the actual track of a tropical cyclone for the first 12 hours after the formation of the tropical cyclone than any of the ensemble model tracks obtained from the forecast centers 110. For a situation where the tropical cyclone is expected to make landfall within that 12 hour period, the predictive tracks from Models A, B, and C are assigned a factor greater than any factor assigned to the ensemble model tracks. The probabilities and BIFs determined by the TCPS 100 are then most greatly influenced by the predictive tracks from Models A, B, and C. With respect to the discussion, it is understood that ensembles of model tracks utilized by the TCPS 100 to determine probabilities and BIFs for the track and characteristic of a tropical cyclone may include both predictive tracks and human influenced tracks without affecting the operation of the TCPS 100 as described hereafter.

Figure 4A:
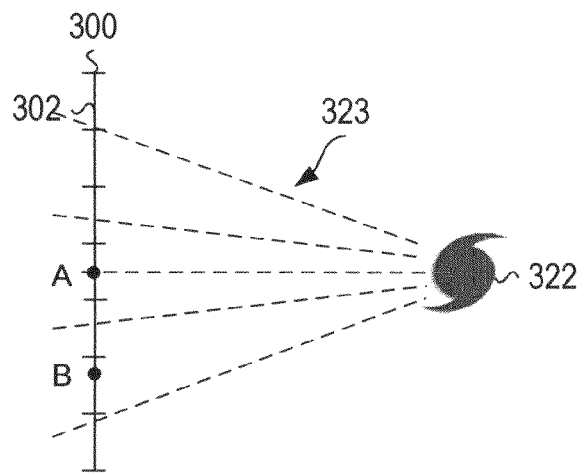
Figure 4B:
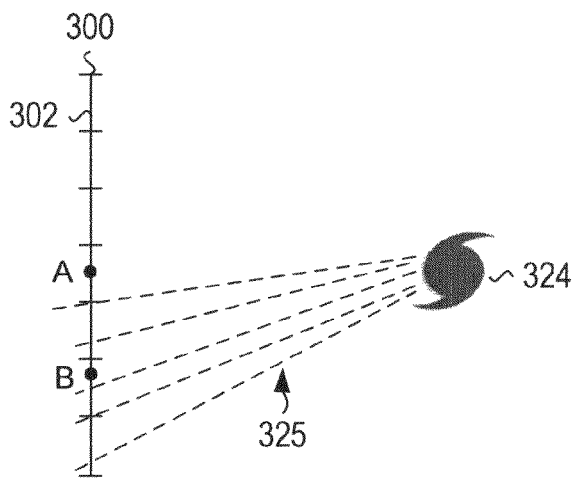
Figure 4C:
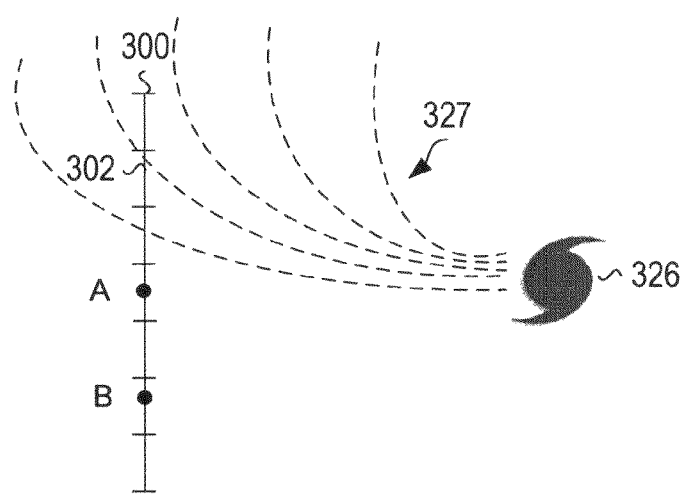

The TCPS 100 then uses the scaled ensembles of model tracks to provide a probability that the tropical cyclone will intersect different sections of a boundary. In one embodiment, the boundary is a geographic boundary, such as a coastline, and the intersection point with the boundary represents the location of landfall of the center of the tropical cyclone. The boundary is divided in number of segments. The length of the segments may all be the same. For example, a 1000 mile long section of coastline may be divided into 10 equal segments of 100 miles. Alternately, some or all of the segments may be of unequal length, for example, the coastline may be sectioned into 8 segments, where the middle four segments are each 100 miles, and the remaining four segments are each 150 miles. Each segment might also be a different length, where the segments are formed based on population centers or concentrations of wealth. Referring to FIGS. 4A-4C, an exemplary coastline 300 is divided into seven equal segments, with one exemplary segment labeled 302.

While the TCPS 100 has no limitations on the number of segments along the boundary (other than the number be a positive integer) or the length of any segment (other than the value be a positive number), there is a practical range for the segments and lengths based on physical scale of tropical cyclones in relation to the boundary, the total number of ensemble tracks available, and the need to provide useful information to the users of the system. For example, if the segments are too short, or there are too many segments, the number of ensemble tracks intersecting each segment may be too low to produce a meaningful probability estimates for each of the segments. If the segments are too large, the probability that the tropical cyclone intersects that boundary does not convey adequate information about where along that boundary the most severe effects of the tropical cyclone will be experience. The geographic boundary is not limited to a physical boundary, such as the previously mentioned coastline. It could be a construct such as a line of latitude or longitude. In one embodiment, the probabilities that the tropical cyclone will intersect different sections of a boundary are determined for boundaries other than a coastline or for conditions other than expected landfall since data can be extracted from the model solutions at any arbitrary boundary since complete time evolution of the tropical cyclone is received in the ensemble forecasts.

For each scaled ensemble model track, the segment where the tropical cyclone is predicted to intersect the boundary is determined. The method of determining the intersection point along the boundary of one of the ensemble tracks is well understood in the art and omission herein should not be considered limiting. For each segment along the boundary a segment value is calculated based on the weighted average of the number of tracks intersecting that boundary, where the weight used for each model track is the scaling factor previously assigned to the model track by the TCPS 100. Model tracks that do not intersect the boundary are aggregated together, and a segment value is calculated. Probabilities of the tropical cyclone intersecting each boundary are determined using the segment value for each boundary divided by the sum of the segment values (including the segment value of the non-intersecting model tracks). For the case where each model track intersects the boundary, the sum of the probabilities for each segment of the boundary is one (e.g., there is 100% chance of landfall of the tropical cyclone along the entire length of the coastline). Where there are model tracks that do not intersect the boundary, the sum of probabilities for each segment of the boundary is less than one (i.e., the tropical cyclone has a finite probability of not making landfall along any section of the coastline).

The set of probabilities for the segments along the entire boundary can be graphically represented as a boundary intersection function (BIF). The boundary intersection function is similar to a probability distribution function (PDF), which is well understood in the art. The boundary intersection function differs from the PDF in that a BIF is not required to have an integrated area under the BIF equal to one, an example of which is described above where some of the model tracks for a tropical cyclone do not intersect any segment along the boundary which is indicative of less then 100% certainty that the tropical cyclone will intersect the boundary (e.g., the tropical cyclone may turn and remain over the water for its entire lifecycle. Referring collectively to FIGS. 4A-4C and FIG. 5, exemplary boundary intersection functions 315, 318, 320 represent the probability of landfall of tropical cyclone 322, 324, 326 along a section of coastline 300 corresponding to exemplary suites of model tracks 323, 325, 327. The probability of landfall is represented on the y-axis 305 and the position along the coastline on the x-axis 310. The x-axis 310 is partitioned into seven sections corresponding to the seven segments in coastline 300 in FIGS. 4A-4C. Note that positions "A" and "B" along coastline 300 in FIGS. 4A-4C correspond to positions "A" and "B" along x-axis 310 in FIG. 5. It should be noted that each of the BIFs 315, 318, 320 in FIG. 5 include a discrete set of points, which are indicative of the exemplary probability for landfall along the coastline for each of the segments as determined by the TCPS 100. The discrete points may be represented as a continuous curve, such as in FIG. 5, using well known mathematical techniques.

Figure 5:
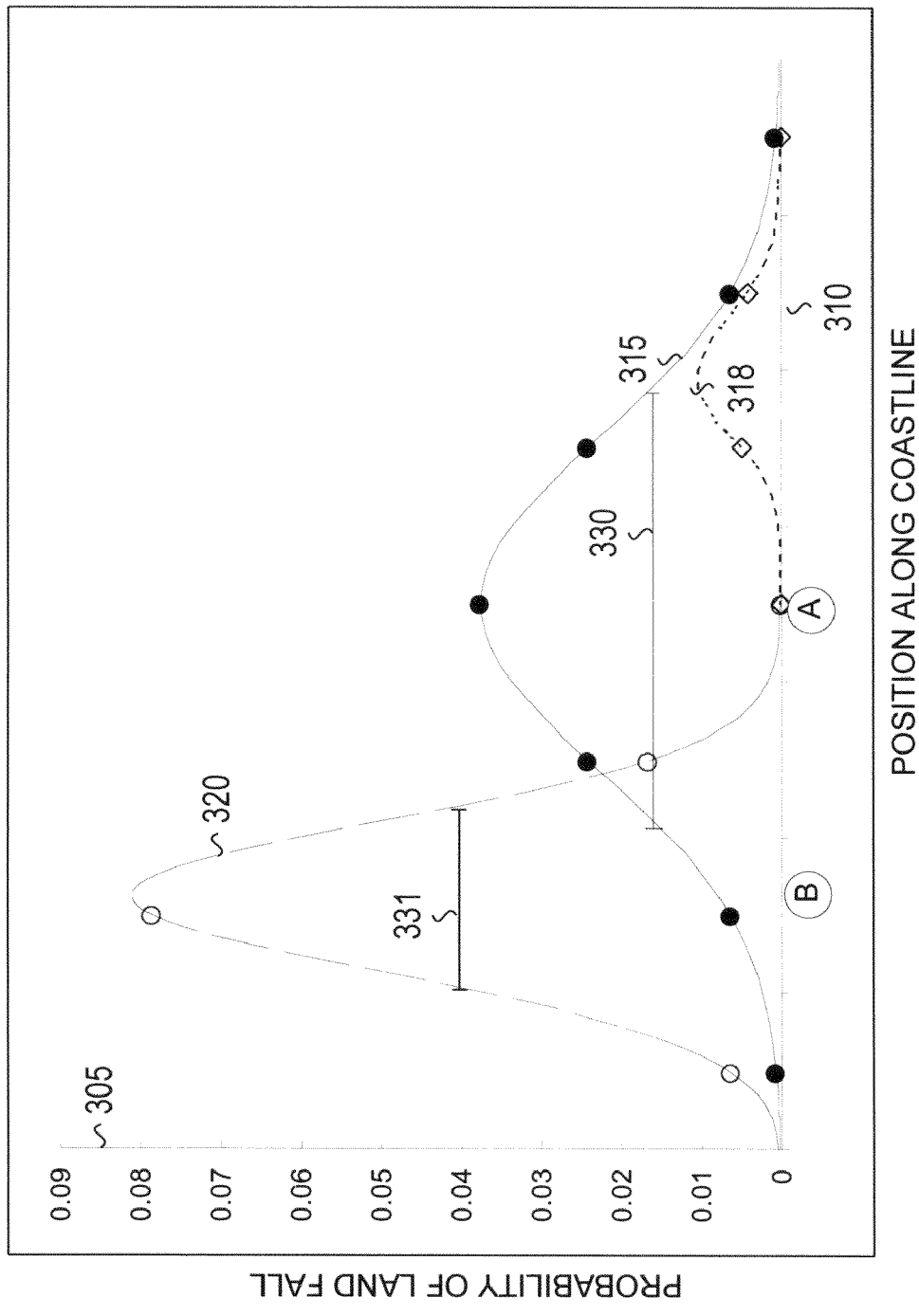

Referring to FIG. 5, the boundary intersection function 315 represents the probability of the tropical cyclone 322 making landfall over the coastline 300 for an exemplary suite of five model tracks collectively labeled 323. The peak of the BIF 315, corresponding to location "A" represents the segment of most probable landfall along the coastline 300, while the width of the distribution 330 represents a measure of the uncertainty of the landfall prediction for the tropical cyclone 322. Similarly, the boundary intersection function 320 represents the probability of the tropical cyclone 324 making landfall over the coastline 300 for an exemplary subset of tracks collectively labeled 325 in FIG. 5. The peak of the BIF 320, corresponding to location "B" represents the segment of most probable landfall along that section of coastline 300, while the width of the distribution 331 represents a measure of the uncertainty of the landfall prediction for the tropical cyclone 324. Uncertainty measurement using the widths of mathematical functions is well known in the art and the description thereof herein should not be considered limiting. Comparing the widths 330, 331 with the spread in the model tracks 323, 325, respectively, shows the spread in the potential landfall points for the different ensemble tracks correlated to the width of the corresponding BIF. In one embodiment, BIFs 315 and 320 may represent two different times for the same tropical cyclone (i.e., tropical cyclones 322, 324 are the same tropical cyclone and the suites of tracks 323 and 325 represent model solution at two different times). If tropical cyclone 322 represents a first time T1 and tropical cyclone 323 represents a second time T2, BIF 315 indicates a most probable landfall for time T1 near A with a first uncertainty, corresponding to the width 330, and BIF 320 indicates a most probable landfall for time T2 at near location B with a second uncertainty, corresponding to the width 331, where the uncertainty in the landfall position at time T2 is less than the uncertainty in the landfall position at time T1.

The area under a BIF represents the total probability that a tropical cyclone will make landfall along a particular geographic boundary, normalized to one when landfall is certain to occur at some point along that geographic boundary. For example, referring again to FIGS. 4A-4C and 5, for tropical cyclones 322, 324 where each of the suite of model runs 323, 325, respectively, indicates the cyclone will intersect the coastline 300, the area under both of the BIFs 315, 320 is one, but for tropical cyclone 326, with a exemplary suite of model tracks 327, where the some of the model tracks predict landfall along coastline 300 and others predict the tropical cyclone 326 remaining over the ocean for its entire lifecycle, the area under BIF 318 is less than one. It should be noted that symmetry of BIFs about their peak is not implied in any way by the BIF representations in FIG. 5. Asymmetry of the BIFs is influenced, without limitation, by the shape of the geographic boundary and the factors assigned to each model track. The exemplary coastline 300 represented as a straight line in FIGS. 4A-4C is not to be considered limiting, as few coastlines are straight on a scale that is meaningful to the size of an area potentially impacted by a tropical cyclone.

Stated another way, the TCPS 100 probability determinations are based on many possible tracks for each forecast time, and the variance of these tracks with the scaling factors assigned by the TCPS 100 is proportional to the forecast uncertainty. Since model tracks might focus narrowly on a single region, fan out over a large area, or cluster around more than one likely landfall location, users can exploit the relative uncertainty implied by the spread of these long-lead forecasts. For example, catastrophe bond traders can establish a more or less risky market position when the TCPS 100 shows a greater or lesser amount of uncertainty at a given time for a given tropical cyclone.

For each forecast period using the scaled ensemble model tracks, the TCPS 100 also produces a most probable track, or mean track, of the tropical cyclone and an estimate of uncertainty of that most probable track where the uncertainty is based on the most current observational data and ensemble data via the spread of the ensemble tracks. This mean track is produced from a weighted average of each of the ensemble track, where again the weighting is determined by the scaling factor.

Figure 6:
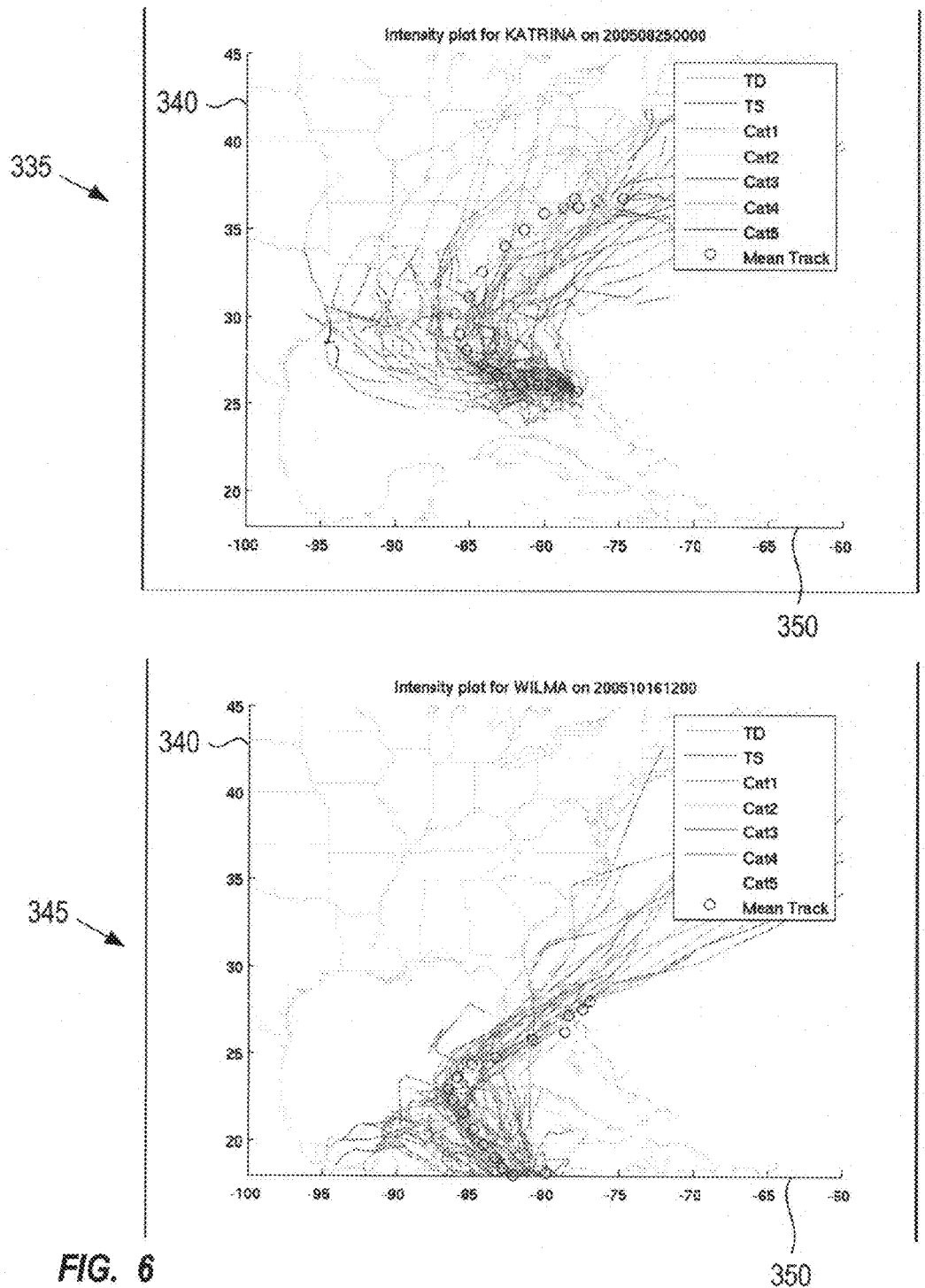

Referring to FIG. 6, the two examples of actual collections of ensemble model tracks 335, 345 from the various forecast centers 110 are shown demonstrating varying degrees of uncertainty of the most probable landfall position of two different tropical cyclones, Katrina and Wilma. The x-axis 350 and y-axis 340 represent longitude and latitude, respectively. Each individual line on the chart represents one model track of one model run from one of the forecast centers 110. The lines are color coded as a function of forecast intensity for each point along the model track. Note that the range of potential landfall locations for Katrina spans almost the entire US Gulf Coast, much of the East Coast, while some of the most easterly tracks remaining entirely over the Atlantic Ocean. The spread of ensemble model tracks alerts the user of the significant uncertainty of this particular forecast. Decisions should then be made not just on the mean track forecast, represented by the circles in FIG. 6, but on the deviation of the entire suite of model tracks from the mean track. In contrast, the model tracks for Wilma show a majority of the suite of model solutions had narrowed to a southern Florida landfall. The narrower spread in the potential model solutions for Wilma compared with Katrina demonstrates a higher confidence in the forecast landfall region for Wilma. The TCPS 100 then uses the scaled ensembles to produce a most probable track of the tropical cyclone and an estimate of uncertainty of that most probable track where the uncertainty is based on the most current observational data and ensemble data via the spread of the ensemble tracks.

Figure 7:
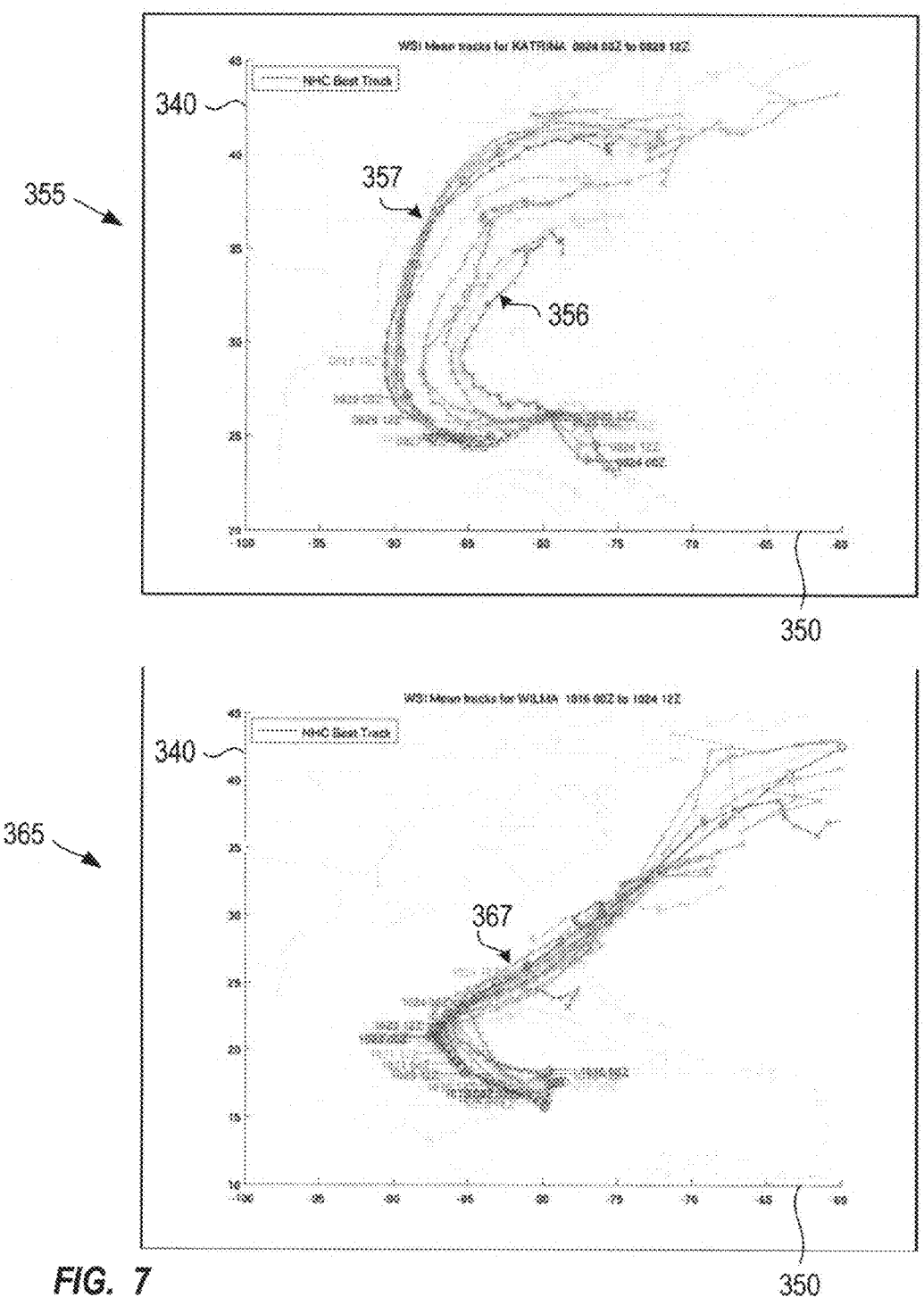

Referring to FIG. 7, the difference in predictability of the same two tropical cyclones can be further illustrated in a time series of mean tracks 355, 365, which indicates the most probable track for a tropical cyclone based on analysis of the suite of ensemble model tracks at any one forecast period as described above. Such time series 355, 365 for actual tropical cyclones Katrina and Wilma are shown in FIG. 7. Similar to FIG. 6, the x-axis 350 and y-axis 340 represent longitude and latitude, respectively. Each curve in FIG. 7 represents the mean track produced by the TCPS 100 for one forecast period. Note that for each forecast period, an associated landfall BIF, as described above (and not shown here), is also produced by the TCPS 100. Time series 355 is a graphical representation of the mean track produced by the TCPS 100 for the five days preceding the eventual landfall of Katrina. The rightmost track 356 corresponds to the earliest time in the series, and the cluster of leftmost tracks 357 represent the later times. The most probable landfall location for Katrina was largely uncertain for the early forecast periods as indicated by the shift for each successive forecast period of most probable landfall location (as indicated by the intersection of the mean track with the coastline) over the entire Northern Gulf coast. Only at the very later forecast times did the most probable landfall locations converge on the New Orleans area (about 3 days ahead of landfall in this case). A time sequence of BIF (not shown) would indicate a gradual shift to the left of the peak as time increases, in addition to a narrowing of the BIF as the time of landfall approached, similar to the exemplary BIFs 315, 320 in FIG. 5. In contrast, the most probable landfall location for Wilma was less uncertain for the early forecast periods as indicated by the narrow spread of potential landfall locations over the south Florida gulf coast. Time series 365 is a graphical representation of mean tracks produced by the TCPS 100 for the eight days preceding the eventual landfall of Wilma. Even at eight days prior to the eventual landfall of Wilma, the cluster of mean tracks 367 indicate a probable landfall location convergence on the southern Florida area. For Wilma, a time sequence of BIF (not shown) would indicate a gradual drifting around the best track landfall position, where the best track as published by the NHC is indicated by the circles in FIG. 7, as well as a slight narrowing of the BIFs for times nearer to landfall.

As stated above, the NHC forecasts are issued with uncertainty estimates (cones), but this information is not storm-specific, and is instead based on mean historical forecast errors. This results in identical cone sizes for all tropical cyclones and all forecasts, regardless of the complexity of any particular track forecast. In contrast, the TCPS 100 incorporates uncertainty estimates that are driven by the actual meteorological conditions at the time of the forecast, as included in the ensemble modeling from the forecast centers 110, which can provide important information for the users when the various suites of ensemble tracks are all converging on the same region many days in the future, as demonstrated for Wilma in FIGS. 6 and 7.

In addition to the track forecasting, accurate intensity (wind speed) forecasts are crucial to predicting the magnitude of potential damage and insured losses at landfall. The forecast centers 110 also provide atmospheric, oceanic, and land-surface data along the ensemble model tracks which is received by the TCPS 100. The TCPS 100 uses the atmospheric, oceanic, and land-surface data as an input into a post-processing model that predicts tropical cyclone intensity. The inputs to the post-processing model include the important parameters that influence tropical cyclone strength: ocean temperature, passage over land, atmospheric wind shear, and other atmospheric, oceanic, and land-surface conditions. The use of the post-processing model is well known in the art as the resolution of the forecast center models used to produce the ensemble model tracks alone is insufficient to reliably predict the wind speed near the center of circulation for the tropical cyclone. The TCPS 100 applies the post-processing model at each position along each of the model tracks obtained from the various forecast centers 110 in order to determine a prediction of the intensity of the tropical cyclone for each position along each of the model tracks.

Figure 8:
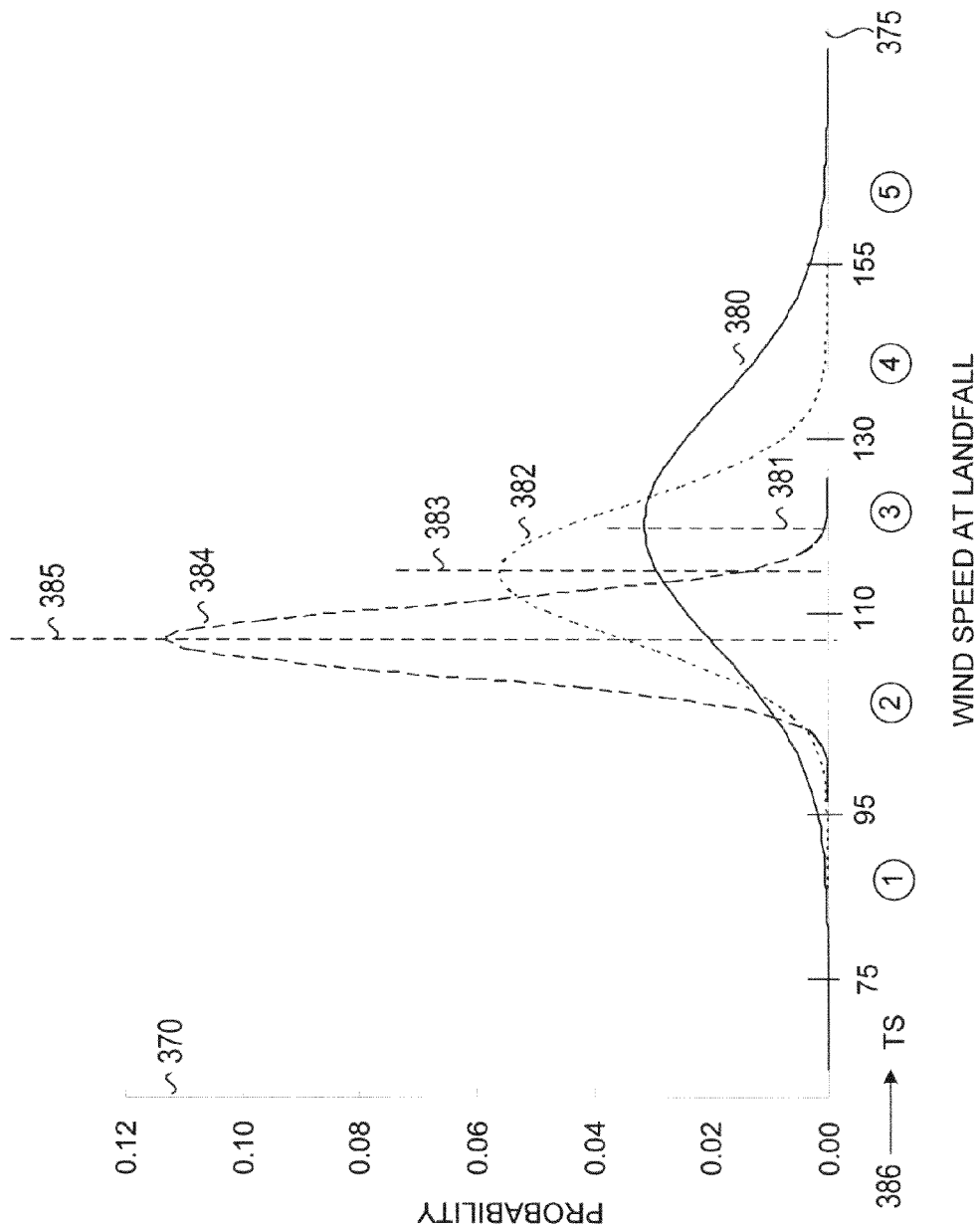

Similar to the track forecasts, the spread between the various intensity forecasts provides valuable information, since the various realizations will define the envelope of possibilities, rather than just providing an average value. Probabilities for ranges of wind speeds at landfall are determined by utilizing the scaled suite of ensemble forecasts. The scaling factors for the intensity predictions do not need to be the same as for the track predictions, as it is recognized by one skilled in the art that the skill for which the combination of the various forecast center models and the post-processing model predict the wind speed for the ensemble model track may be quite different than the skill for which the forecast center models predict the path of the model tracks. The wind speed ranges are analogous to the boundary sections for the landfall forecasts, and the resulting probabilities of wind speeds in a given range at landfall are obtained in similar manner as discussed above for the track probabilities. The wind speed at the landfall position for each model track is first determined. Then, a probability for each wind speed range is determined using a weighted average of the number of model tracks falling within that wind speed range. The wind speed is typically used to categorize the intensity of a tropical cyclone where a discrete intensity level of the tropical cyclone corresponds to wind speed range. One example is intensity categories in the North Atlantic Basin use the well known Saffir-Simpson scale, where each intensity level corresponds to range of wind speeds. As understood by those skilled in the art, for different regions and oceans basins around the globe, different intensity categories, along with corresponding wind speed ranges are utilized Referring to FIG. 8, a exemplary time sequence of BIFs 380, 382, 384 for wind speed at landfall is shown for three different times, where BIF 380 is for t1, BIF 382 is for t2, BIF 384 is for t3, and t1<t2<t3. Note for simplicity, the discrete probabilities for each range of wind speeds is not shown, only the representative continuous curve obtained from the discrete points. The y-axis 370 represents the probability of a wind speed at landfall and the x-axis 375 represents the wind speeds. The peak value of each of the BIFs 380, 382, 384 represents the most probable wind speed at landfall. Again, uncertainty in the wind speed forecast is represented by the BIF widths. Since the total area under each of the curves is normalized to unity, the relative peak highs and widths between the BIFs provide an indication of the convergence of the forecast over time. It should be noted that unlike for the landfall BIFs describe above, the entire range of potential values for wind speed are plotted on the x-axis 375, therefore the integrated area under any wind speed BIF is unity, where it is possible that the integrated area under a landfall BIF is less than one if some of the model tracks do not intersect the boundary. For example, referring to FIG. 8, the probability of a particular wind speed at the landfall location is plotted for three different times t1, t2, and t3, represented by BIFs 380, 382, 384, respectively. The x-axis 375 is marked with the wind speeds corresponding to transitions between the categories of the Saffir-Simpson scale, with the categories 386 for each of the wind speed ranges also noted. For time t1, the most probable wind speed at landfall 381, corresponds to a mid category 3 hurricane, while the range of possible wind speeds at landfall includes a potential for a intensity ranging from strong category 1 to a weak category 5. In other words, the intensity is highly uncertain at time t1. At a time t2, later than t1, the most probable intensity landfall category is now a weak category 3 tropical cyclone as indicated by the most probable wind speed 383 of BIF 382, with the range of possible intensities predicted to range from weak category 2 to strong category 3. At time t3, the sharp peak of BIF 385 indicates a high probability of a strong, category 2 tropical cyclone intensity at landfall, with a range of mid category 2 to mid category 3. It should be noted that, in general, intensity BIFs such as those in FIG. 8, do not indicate most likely location of landfall (which is determined using the landfall location BIFs described above), so that the most probable landfall locations for a tropical cyclone at t1 though t3 are not necessarily the same.

In addition to predicting track and intensity forecasts as described above, the TCPS 100 can provide predictions and BIFs for other characteristics of a tropical cyclone, including but not limited to minimum central pressure, storm surge, radius of impact (e.g., extent of hurricane force winds), precipitation rate, and tornado potential, using the methods describe above for the intensity and wind speed.

The BIFs produced by the TCPS 100 for any one tropical cyclone are customizable according to the needs of users of the data. Thus, for any one forecast period, the TCPS 100 may provide and distribute many different BIFs for a tropical cyclone, each one determined for a different set of user definable parameters. These parameter include, but are not limited to, the number of segments, length of the segments, positioning of the segments, or wind speed ranges. For example, catastrophe bond investors/traders and reinsurance companies may desire a track BIF segmented based on distributions of wealth, whereas emergency management officials may be more interested in a segmentation of the coastline based on population centers, with local agencies interested in a smaller area of the coastline than national organizations. The TCPS 100 may also determine the BIFs for boundaries other than a coastline or for times other than expected landfall. BIFs can be extracted from the model solutions at any arbitrary boundary and any arbitrary time since predictions of time evolution of the tropical cyclone is received in the ensemble forecasts. As an example, shipping companies and airlines may be interested in BIFs using non-physical boundaries such as lines of longitude in order to achieve business objectives, such as minimizing late deliveries or maximizing passenger comfort, which could require significant rerouting or rescheduling.

Figure 9:
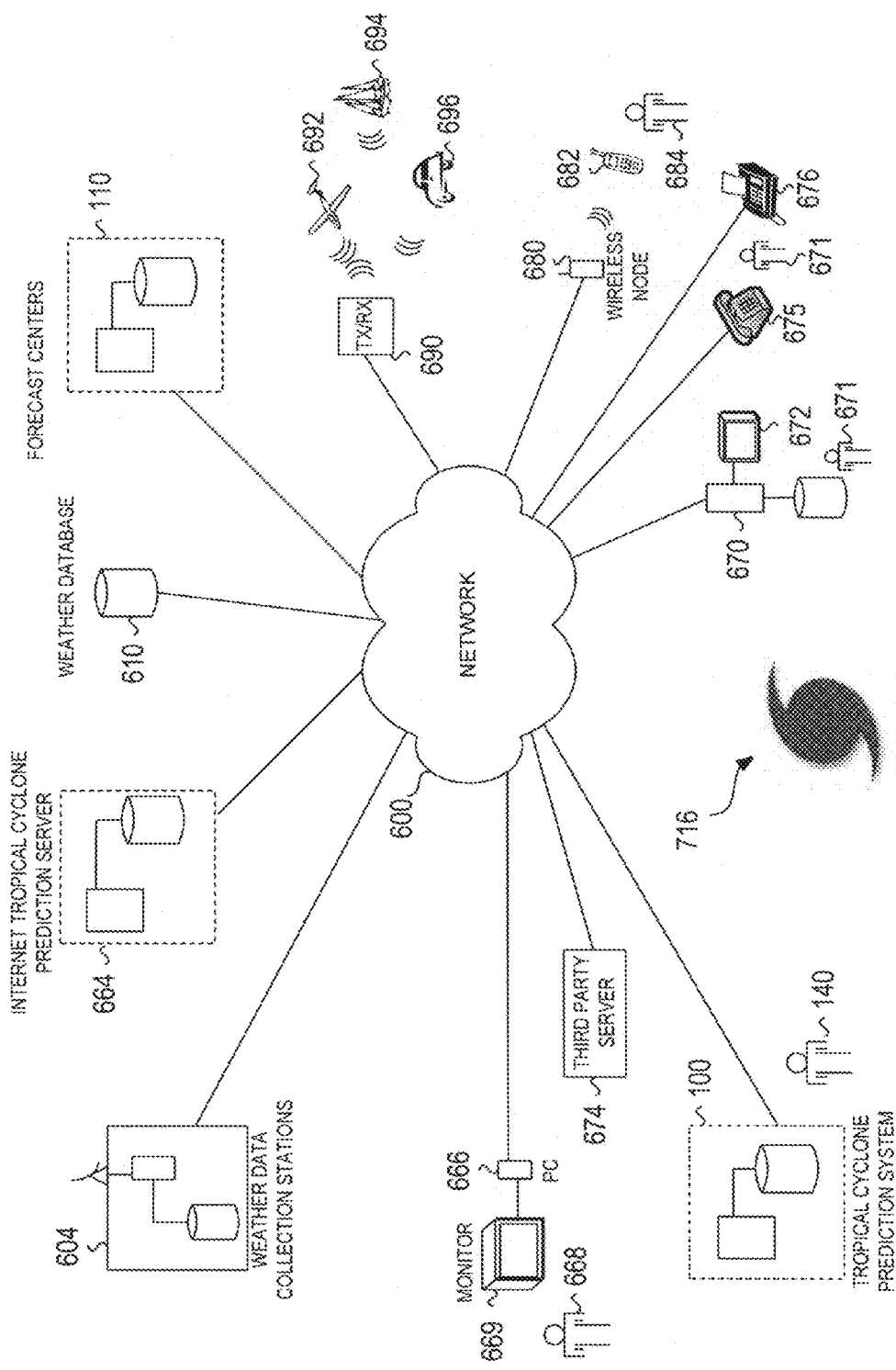

FIG. 9 is a network diagram that includes the TCPS 100. Weather data collection stations 604 obtain data related to tropical cyclones and other ground and atmospheric conditions at various locations (not shown) including, among other systems, satellite imagery centers that receive data from satellites, surface weather observation stations, lightning detection systems, and/or radar processing stations. Additional data may also be gathered from vehicles or mobile transmitters/receivers, including aircraft 692, ships 694 and ground transportation 696, along with information regarding their locations. Vehicles may transmit, receive, or transmit and receive to and from one of a system of transmitters and receivers 690. The system may also collect some types of data from mobile users 684 using handheld or portable devices 682 via a wireless network 680. Such data may include one or more of weather-related data, imagery, video, audio, or related position information. Data from each source may be produced in different formats. Such weather-related data may be transferred over a variety of public and/or private wired and wireless networks 600 generally known in the art, including the Internet, LAN, or other computer-based communication or information sharing system to one or more weather databases 610 or forecast centers 110. Previously gathered and/or analyzed data may also be present in one or more weather databases 610.

In one embodiment, one or more data sources, including the weather databases 610, and forecast centers 110 provide information over the network 600 to the TCPS 100. The TCPS 100 may also contain an internal weather database. Such information may be provided in any format or protocol generally known in the art, including an extensible markup language (XML) format. The TCPS 100 provides boundary intersection functions and other data related to tropical cyclones as previously described to the subscriber 671 or user 668.

The tropical cyclone BIFs and other data or information, collectively referred to herein as tropical cyclone forecast data, produced by the TCPS 100 may reside on a PC or server, or distributed servers (not shown). It could use commercial or open source database platforms such as Oracle, Microsoft SQL Server, MySQL, or PostgreSQL. The TCPS 100 may provide external communication through database connections, custom interfaces, or a web application server, or any other communications medium or system generally known in the art.

In one embodiment, the TCPS 100 provides tropical cyclone forecast data to a subscriber system 670 used by a subscriber 671. Examples of subscribers include commodity traders, financial brokers, insurance and reinsurance companies, television or network broadcasters, government agencies, emergency relief organizations, or any other entity or service interested in obtaining topical cyclone forecast data. The subscribers 671 may or may not pay a fee for access to or otherwise obtaining the tropical cyclone forecast data from the TCPS 100. In one embodiment, the data transfers could be accomplished using the transfer of XML data. The tropical cyclone forecast data is viewed by the subscriber 671 using software and hardware tools 672 to navigate through graphical and/or textual display of the tropical cyclone forecast data and other weather related information supplied by the TCPS 100. The information may also be received as an e-mail or instant message indicating qualitative and quantitative information related to the tropical cyclone forecast data provided by the TCPS 100. As describe above, the tropical cyclone forecast data may be provided in a customized format for each subscriber system 670 based on the needs of the subscriber 671.

The information may be displayed graphically showing the differences between the current TCPS 100 forecast data and the previous TCPS 100 forecast data (from earlier forecast periods) to aid the subscriber in rapidly assessing any changes in the predicted future conditions predicted by TCPS 100. For example, the time sequence of mean forecast tracks 355, 365 shown in FIG. 7 is representative of one embodiment of graphically displaying difference between current and previous TCPS 100 forecast data.

In an embodiment, tropical cyclone forecast data can be provided to subscribers 671 via voice communication and/or conventional telephone service or devices 675, including facsimile machines 676. Information can also be received by the subscriber on a handheld or portable device 682, such as cell phone or PDA.

Portions or all of the tropical cyclone forecast data may be transferred to an Internet or networked tropical cyclone prediction server 664. The tropical cyclone prediction server 664 may be a simple PC, a web server, a combination of separate web server, application server, and database server, or other arrangement of server resources. The Internet tropical cyclone prediction server 664 could provide tropical cyclone forecast data over the network 600 to other network systems or to PCs 666 with attached monitors 669 displaying Internet browsers or other applications operated by users 668. The users 668 are similar to the subscribers 671, previously described. In another embodiment, the Internet tropical cyclone prediction server 664 is accessed by mobile users 684 of portable devices 682 via the wireless communication network 680.

The Internet tropical cyclone prediction server 664 could serve a web page containing both HTML and JavaScript code.

The JavaScript code could periodically, or upon user interaction, obtain additional or more up-to-date tropical cyclone forecast data from the tropical cyclone prediction server 664 without reloading the web page. In one embodiment, the data is in XML form.

In another embodiment, tropical cyclone forecast data from the TCPS 100 are also provided to Internet or network users 668. The tropical cyclone forecast data could be presented via a web-based interface through an Internet browser or customer application on the users' PCs 666 to allow interactive exploration of the tropical cyclone forecast data. A user 668 could enter the URL of a tropical cyclone prediction server 664. The server could attempt to distinguish the user's location from IP address information, from a previously stored browser cookie, or from user input.

The tropical cyclone forecast data may also be provided by the TCPS 100 to a third-party server 674. In one embodiment, the subscriber 671 of the TCPS 100 could provide data to third-parties, who would then provide value-added analysis or repackaging of the data.

In one embodiment, forecast data from the TCPS 100 is used by third-parties to provide value-added services. For example, a search engine operator may provide recent news or other information related to a tropical cyclone in addition to tropical cyclone forecast data obtained from the TCPS 100 in response to weather-related keywords. For example, an Internet search for "hurricane tampa" could produce a map of current and/or predicted tropical cyclones impacting the Tampa area, along with information related to information about the tropical cyclones obtained from the TCPS 100 and other information sources. The graphical results could be provided with regions responsive to further user input, allowing the user to trigger display of additional information about emergency planning or damage assessments. The search could be conducted on data transmitted to the search engine provider's database, or via calls to the Internet tropical cyclone prediction server 664 or similar resource provided on the network 600.

Figure 10:
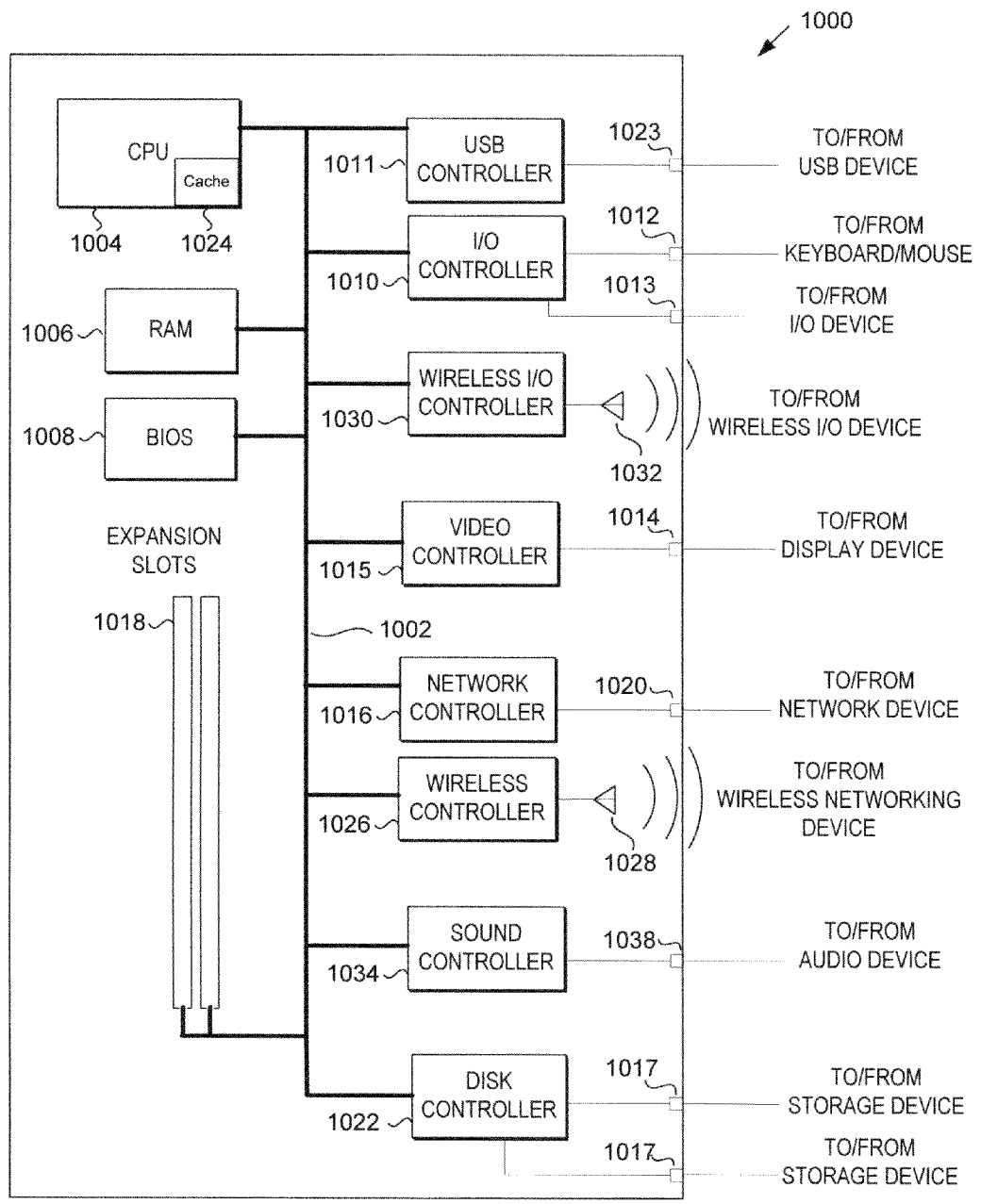

FIG. 10 is a block diagram of a computer system 1000 through which the embodiments of the present invention may be implemented. A system bus 1002 transports data amongst the Central Processing Unit (CPU) 1004, RAM 1006, the Basic Input Output System (BIOS) 1008 and other components. The CPU 1004 may include a cache memory component 1024. The computer system 1000 may include one or more external storage ports 1017 for accessing a hard disk drive, optical storage drive (e.g., CD-ROM, DVD-ROM, DVD-RW), flash memory, tape device, or other storage device (not shown). The relevant storage device(s) are connected through the external storage port 1017 which is connected to the system bus 1002 via a disk controller 1022. A keyboard and pointing device (e.g. mouse, touch pad) (not shown) can be connected to the keyboard/mouse port(s) 1012, and other I/O devices could be connected to additional I/O port(s) 1013, which are connected to the system bus 1002 through the I/O controller 1010. Additional ports or devices, such as serial ports, parallel ports, firewire adapters, or biometric devices (not shown), may be utilized through the I/O controller 1010A display device (not shown) can be connected to a display device port 1014 which is connected to the system bus 1002 through the video controller 1015. A network device (not shown), including but not limited to an Ethernet device or other device having networking capability, can be connected to a network port 1020 which is connected through the network controller 1016 to the system bus 1002. The computer system 1000 may be wirelessly connected to a network device that is configured for wireless operation (not shown), including but not limited to wireless routers, using an antenna 1028 connected to a wireless controller 1026 connected to the system bus 1002, where the antenna transmits/receives signals to/from the network device. The computer system 1000 may include one or more USB ports 1023. A USB device (not shown), including but not limited to a printer, scanner, keyboard, mouse, digital camera, storage device, PDA, cellular phone, biometric device, webcam, and I/O adapters can be connected to the USB port 1023 which is connected to the system bus 1002 through the USB controller 1011. Other devices, such as cellular phones, PDAs, and other portable devices may also be connected wirelessly via a wireless I/O antenna 1032 that is connected to a wireless I/O controller 1030. Examples of wireless I/O technologies include, but are not limited to, Bluetooth, Infrared (IR), and Radio-Frequency (RF). Audio devices, such as microphones, speakers, or headphones may be connected to a sound port 1038 that is connected to a sound controller 1034 that is connected to the system bus 1002. Expansion slots 1018 can be comprised of Industry Standard Architecture (ISA) slots, Peripheral Component Interconnect (PCI) expansion slots, PCI Express expansion slots, Accelerated Graphics Port (AGP) slots or any other slot generally known in the art to allow additional cards to be placed into the computer system 1000. These slots can be used to connect network cards, video cards, sound cards, modems and any other peripheral devices generally used with a computer. The computer system 1000 also includes a source of power (not shown), including but not limited to a power supply connected to an external source of power, and an internal or external battery. Detailed descriptions of these devices have been omitted for convenience only and should not be construed as limiting. The computer system 1000 shown in FIG. 10 can be part of the TCPS 100, or can be a processor present in another element of the network 600.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

Although the description above contains many specific examples, these should not be construed as limiting the scope of the invention but as merely providing illustrations of some of the presently preferred embodiments of this invention. Thus, the scope of the invention should be determined by the appended claims and their legal equivalents, rather than by the examples given.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the embodiments of the present invention.

We claim:

1. A method of providing information related to a weather phenomenon, the method comprising:
   (a) obtaining a plurality of model tracks corresponding to the weather phenomenon for a current forecast period from two or more forecast centers;

(b) assigning a scaling factor to each of the plurality of model tracks based on which of the two or more forecast centers produced the respective model track;

(c) determining, by at least one computer, a probabilistic description of one or more characteristics of the weather phenomenon based on a statistical analysis of the model tracks corresponding to the weather phenomenon using the scaling factor assigned to each of respective model tracks; and (d) providing an electronic representation of the probabilistic description.

2. The method of claim 1, wherein the providing step comprises providing capabilities for downloading the electronic representation by at least one entity.

3. The method of claim 2, wherein the at least one entity uses the downloaded electronic representation to facilitate forecasting a financial impact of the weather phenomenon.

4. The method of claim 1, further comprising:

(e) periodically updating the probabilistic description using an updated plurality of model tracks generated by the two or more forecast centers.

5. The method of claim 1, where an uncertainty for the one or more characteristics is determined based on the statistical analysis of the model tracks corresponding to the weather phenomenon.

6. The method of claim 1, wherein the statistical analysis of the model tracks includes applying a post-processing model to each of the plurality of model tracks at one or more locations along the model track using atmospheric, oceanic, and land-surface data corresponding to the model track, and statistically aggregating results from applying the post-processing model using the scaling factors.

7. A method of providing information related to a weather phenomenon, the method comprising:

(a) obtaining a plurality of model tracks corresponding to the weather phenomenon for a current forecast period from two or more forecast centers;

(b) determining, by at least one computer, a probabilistic description of an intersection of the weather phenomenon with a boundary based on a statistical analysis of the model tracks corresponding to the weather phenomenon; and (c) providing an electronic representation of the probabilistic description, wherein a statistical uncertainty for the intersection of the weather phenomenon with the boundary is proportional to a variance of intersection points determined for each of the plurality of model tracks at the boundary, the contribution of each intersection point to the variance based on a scaling factor corresponding to which of the two or more forecast centers produced the respective track.

8. The method of claim 7, wherein the providing step comprises providing capabilities for downloading the electronic representation by at least one entity.

9. The method of claim 8, wherein the at least one entity uses the downloaded electronic representation to facilitate forecasting a financial impact of the weather phenomenon.

10. The method of claim 7, further comprising:

(d) periodically updating the probabilistic description using an updated plurality of model tracks generated by the two or more forecast centers.

11. The method of claim 7, wherein the boundary is a coastline and the intersection with the boundary represents a landfall of a tropical cyclone.

12. The method of claim 7, wherein determining the probabilistic description includes assigning a scaling factor to each of the plurality of model tracks based on which of the two or more forecast centers produced the respective model track, determining a position corresponding to an intersection of each of the model tracks with the boundary, and statistically aggregating the resulting positions using the scaling factors.

13. A method of providing information related to a weather phenomenon, the method comprising:

(a) obtaining a plurality of model tracks for a current forecast period from two or more forecast centers;

(b) determining model tracks of the plurality of model tracks that do not correspond to at least one previously identified weather phenomenon instance;

(c) identifying one or more new weather phenomenon instances corresponding to the model tracks determined in step (b) for the current forecast period; and (d) providing, by at least one computer, a probabilistic description of one or more characteristics of the one or more new weather phenomenon instances based on a statistical analysis of the model tracks corresponding to each of the one or more new weather phenomenon instances, wherein the statistical analysis includes:

assigning a scaling factor to each of the plurality of model tracks based on which of the two or more forecast centers produced the respective model track;

applying a post-processing model to each of the plurality of model tracks at one or more locations along the model track using atmospheric, oceanic, and land-surface data corresponding to each of the model tracks; and statistically aggregating results from the applying the post-processing model using the scaling factors.

14. The method of claim 13, further comprising:

(e) periodically repeating steps (a)-(d) using an updated plurality of model tracks generated by the two or more forecast centers.

15. The method of claim 13, wherein the scaling factor is assigned based in part on at least one of a geographic position of the one or more new weather phenomenon instances, the one or more characteristics of the one or more new weather phenomenon instances, at least one of atmospheric, oceanic, and land-surface conditions affecting the one or more new weather phenomenon instances, and a time of year for the occurrence of the one or more new instances of the weather phenomenon.

16. The method of claim 13, wherein the one or more characteristics are descriptive of the one or more new weather phenomenon instances at a position corresponding to an intersection of the one or more new weather phenomenon instances with a boundary.

17. The method of claim 16, wherein the one or more characteristics include at least one of wind speed, minimum central pressure, radius of impact, precipitation rate, tornado potential, and storm surge height.

18. The method of claim 13, wherein the weather phenomenon is a tropical cyclone.

19. The method of claim 13, wherein the probabilistic description is a boundary intersection function, the boundary intersection function being a graphical representation of a set of probabilities corresponding to values of the one or more characteristics at an intersection with a boundary.

20. The method of claim 13, wherein providing the probabilistic description includes electronically publishing the probabilistic determination for at least one entity, the at least one entity using the published representation to facilitate forecasting a financial impact of the one or more new weather phenomenon instances.

21. A method of providing information related to a tropical cyclone, the method comprising:

(a) obtaining a plurality of model tracks for a current forecast period from two or more forecast centers;
(b) associating each of the plurality of model tracks with at least one tropical cyclone instance;
(c) assigning a scaling factor to each of the plurality of model tracks based on which of the two or more forecast centers produced the respective model track;
(d) determining, by at least one computer, a probabilistic description of one or more characteristics of the at least one tropical cyclone instance based on a statistical analysis of the model tracks associated with the at least one tropical cyclone instance using the scaling factor assigned to each of respective model tracks;
(e) providing an electronic representation of the probabilistic description.

22. The method of claim 21, wherein the providing step comprises publishing the electronic representation of the probabilistic description to an entity.

23. The method of claim 21, wherein the at least one tropical cyclone instance includes at least one new tropical cyclone instance identified based on one or more of the model tracks not being associated with one or more previously identified tropical cyclone instances.

24. The method of claim 22, wherein the providing includes providing capabilities for downloading the electronic representation of the probabilistic description by at least one entity, the at least one entity using the published representation to facilitate forecasting a financial impact of the at least one tropical cyclone instance.

25. The method of claim 21, further comprising:
(f) periodically repeating steps (a)-(e) using an updated plurality of model tracks generated by the two or more forecast centers.

26. The method of claim 21, wherein the statistical analysis of the model tracks applying a post-processing model to each of the plurality of model tracks at one or more locations along the model track using atmospheric, oceanic, and land-surface data corresponding to the model track, and statistically aggregating results from applying the post-processing model using the scaling factors.

27. A method of predicting information related to a tropical cyclone, the method comprising:
(a) obtaining a plurality of model tracks for a current forecast period from two or more forecast centers;
(b) associating each of the one or more model tracks with at least one tropical cyclone instance;
(c) assigning a scaling factor to each of the plurality of model tracks based on which of the two or more forecast centers produced the respective model track;
(d) determining, by at least one computer, a probabilistic description of an intersection of the at least one tropical cyclone instance with a boundary based on a statistical analysis of the model tracks associated with the at least one tropical cyclone instance using the scaling factor assigned to each of respective model tracks; and
(e) providing an electronic representation of the probabilistic description.

28. The method of claim 27, wherein the boundary is a coastline and the intersection with the boundary represents a landfall of the tropical cyclone instance.

29. The method of claim 27, further comprising:
(f) periodically repeating steps (a)-(e) using an updated plurality of model tracks generated by the two or more forecast centers.

30. The method of claim 27, wherein the at least one tropical cyclone instance includes a new tropical cyclone instance identified based on one or more of the model tracks not being associated with one or more previously identified tropical cyclone instances.

31. The method of claim 27, wherein the statistical analysis of the model tracks includes determining a position corresponding to an intersection of each of the model tracks with the boundary, and statistically aggregating the resulting positions using the scaling factors.

32. An article of manufacture for providing information related to a weather phenomenon, the article of manufacture comprising a non-transitory computer-readable medium holding computer-executable instructions for performing a method comprising:
(a) obtaining a plurality of model tracks for a current forecast period from two or more forecast centers;
(b) determining model tracks of the plurality of model tracks that do not correspond to at least one previously identified weather phenomenon instance;
(c) identifying one or more new weather phenomenon instances corresponding to the model tracks determined in step (b) for the current forecast period; and
(d) providing a probabilistic description of one or more characteristics of the one or more new weather phenomenon instances based on a statistical analysis of the model tracks corresponding to each of the one or more new weather phenomenon instances, wherein the statistical analysis includes:
assigning a scaling factor to each of the plurality of model tracks based on which of the two or more forecast centers produced the respective model track;
applying a post-processing model to each of the plurality of model tracks at one or more locations along the model track using atmospheric, oceanic, and land-surface data corresponding to each of the model tracks; and
statistically aggregating results from the applying the post-processing model using the scaling factors.

* * * * *